United States Patent
McKinley et al.

(10) Patent No.: US 11,946,439 B2
(45) Date of Patent: Apr. 2, 2024

(54) FUEL MODULE FOR ENGINE HAVING SERVICE VALVE ASSEMBLY FOR COMMON DRAIN FROM PRIMARY AND SECONDARY FILTERS

(71) Applicant: Caterpillar Inc., Peoria, IL (US)

(72) Inventors: Michael Taylor McKinley, Washington, IL (US); Jon Tyler Immel, Chillicothe, IL (US); Brian J Sutton, Edwards, IL (US); Stephen Ellis Oedewaldt, Mapleton, IL (US); Iulian Gabriel Ghiorghias, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 17/739,502

(22) Filed: May 9, 2022

(65) Prior Publication Data
US 2023/0358194 A1  Nov. 9, 2023

(51) Int. Cl.
| | |
|---|---|
| F02M 37/48 | (2019.01) |
| B01D 29/52 | (2006.01) |
| B01D 29/56 | (2006.01) |
| F02M 37/42 | (2019.01) |
| F02M 37/44 | (2019.01) |

(52) U.S. Cl.
CPC ............. *F02M 37/48* (2019.01); *B01D 29/52* (2013.01); *B01D 29/56* (2013.01); *F02M 37/42* (2019.01); *F02M 37/44* (2019.01)

(58) Field of Classification Search
None
See application file for complete search history.

(56) References Cited

U.S. PATENT DOCUMENTS

| | | | |
|---|---|---|---|
| 3,056,499 A | 10/1962 | Liddel | |
| 3,741,396 A * | 6/1973 | Muller | B01D 35/043 |
| | | | 210/335 |
| 9,440,169 B2 * | 9/2016 | Shafer | B01D 29/52 |
| 11,020,692 B2 * | 6/2021 | Breinig | B01D 29/665 |
| 11,268,482 B2 * | 3/2022 | Tian | F02M 37/18 |
| 2004/0069700 A1 * | 4/2004 | Miller | B01D 35/153 |
| | | | 210/235 |
| 2014/0021118 A1 * | 1/2014 | Shafer | B01D 29/56 |
| | | | 210/232 |

(Continued)

FOREIGN PATENT DOCUMENTS

| | | | |
|---|---|---|---|
| CA | 2707230 A1 * | 12/2010 | ............. B01D 35/12 |
| CN | 202140212 U * | 2/2012 | |

(Continued)

*Primary Examiner* — Kevin R Steckbauer
(74) *Attorney, Agent, or Firm* — Brannon Sowers & Cracraft PC (57) ABSTRACT

A filter module for filtering fuel in an engine system includes a primary filter, a secondary filter, and a module housing. A drain valve is movable between a closed position blocking a drain port in the module housing, and an open position. A service valve assembly is positioned at least partially within a cross passage in the module housing and adjustable from a closed configuration blocking a primary-side fuel passage from a secondary-side fuel passage in the module housing, to an open configuration, to drain fluids from the filter module by way of the single drain port.

18 Claims, 4 Drawing Sheets

(56) References Cited

U.S. PATENT DOCUMENTS

| | | | | |
|---|---|---|---|---|
| 2015/0021246 | A1* | 1/2015 | Sturgess | F02M 37/28 |
| | | | | 123/557 |
| 2017/0095759 | A1 | 4/2017 | Martin | |
| 2018/0008913 | A1* | 1/2018 | Breinig | B01D 29/52 |
| 2021/0324821 | A1* | 10/2021 | Tian | B01D 29/56 |
| 2023/0123929 | A1* | 4/2023 | Petrod | B01D 27/142 |
| | | | | 210/153 |
| 2023/0358194 | A1* | 11/2023 | McKinley | F02M 37/48 |

FOREIGN PATENT DOCUMENTS

| | | | | | |
|---|---|---|---|---|---|
| CN | 202732178 | U | * | 2/2013 | |
| CN | 102996306 | A | * | 3/2013 | |
| CN | 103573502 | A | * | 2/2014 | B01D 29/52 |
| CN | 104500296 | A | * | 4/2015 | |
| CN | 104863765 | A | * | 8/2015 | |
| CN | 105764591 | A | * | 7/2016 | B01D 35/005 |
| CN | 104500296 | B | * | 2/2017 | |
| CN | 106499554 | A | * | 3/2017 | |
| CN | 103573502 | B | * | 5/2017 | B01D 29/52 |
| CN | 107206295 | A | * | 9/2017 | B01D 29/52 |
| CN | 206503663 | U | | 9/2017 | |
| CN | 105764591 | B | * | 3/2018 | B01D 35/005 |
| CN | 108079639 | A | * | 5/2018 | B01D 29/33 |
| CN | 207913331 | U | * | 9/2018 | B01D 29/33 |
| CN | 208793140 | U | * | 4/2019 | |
| CN | 212594301 | U | | 2/2021 | |
| CN | 112459940 | A | * | 3/2021 | F02M 31/125 |
| CN | 213981011 | U | * | 8/2021 | F02M 31/125 |
| CN | 215927624 | U | * | 3/2022 | |
| CN | 115263631 | A | * | 11/2022 | |
| DE | 10343555 | A1 | * | 4/2004 | B01D 35/153 |
| DE | 102012005206 | A1 | * | 9/2013 | B01D 29/605 |
| DE | 102013011852 | A1 | * | 1/2014 | B01D 29/52 |
| DE | 102015002767 | A1 | * | 9/2016 | B01D 29/52 |
| DE | 102017000938 | A1 | * | 8/2017 | B01D 29/07 |
| EP | 3265202 | B1 | * | 2/2021 | B01D 29/52 |
| EP | 4154963 | A1 | * | 3/2023 | B01D 27/142 |
| WO | WO-2016138983 | A1 | * | 9/2016 | B01D 29/52 |

\* cited by examiner

FUEL MODULE FOR ENGINE HAVING SERVICE VALVE ASSEMBLY FOR COMMON DRAIN FROM PRIMARY AND SECONDARY FILTERS

TECHNICAL FIELD

The present disclosure relates generally to a filter module, and more particularly to a service valve assembly in a filter module adjustable to fluidly connect primary and secondary filter receptacles to a common drain.

BACKGROUND

Fuel systems are among the most complex and sophisticated parts of modern internal combustion engine systems. A typical implementation can employ dozens or even hundreds of moving parts. The various valves, plungers, and other components may be operated at high speeds and subjected to high pressure and rapid pressure changes. In the diesel engine fuel system context, fuel stored in a tank is typically increased in pressure for direct injection into cylinders in the engine. Fuel pressurization may be achieved with dedicated unit pumps associated with or integral to each one of a plurality of fuel injectors for the engine. In other systems a pressurized common reservoir of fuel is maintained for delivery as needed to some or all of the fuel injectors. A great many different combinations and extensions of these two basic strategies for fuel delivery and fuel pressurization have been proposed over the years.

It is also generally desirable in fuel systems to limit debris in the flow of fuel to prevent damage or performance degradation, especially respecting pumps and fuel injectors. To this end, most fuel systems are equipped with various filtration apparatuses for trapping particles that are introduced into the fuel supply or produced by operation of the fuel system components. Multiple pumps, including a fuel transfer pump and at least one high-pressure pump, as well as multiple filters are typically employed, requiring lines, fittings, housings, and other equipment for supporting and packaging the components for service. Engineers are continually seeking new and improved ways to limit debris whilst maintaining efficient serviceability of fuel system components. United States Patent Application Publication No. 20160333834 illustrates one example fuel supply system employing a plurality of fuel injection pumps.

SUMMARY

In one aspect, a fuel filter module for an engine includes a primary filter, a secondary filter, and a module housing having a primary filter receptacle receiving the primary filter, and a secondary filter receptacle receiving the secondary filter. The module housing has formed therein a primary-side fuel passage, a secondary-side fuel passage, a cross passage connecting between the primary-side fuel passage and the secondary-side fuel passage, and a drain port. The fuel filter module further includes a drain valve movable between a closed position blocking the drain port, and an open position, and a service valve assembly at least partially within the cross passage and adjustable from a closed configuration blocking the primary-side fuel passage from the secondary-side fuel passage, to an open configuration.

In another aspect, a filter module includes a module housing having a primary filter receptacle, and a secondary filter receptacle, and having formed therein a supply inlet, a filtered outlet, and a drain port. The module housing further has formed therein a primary-side passage fluidly connected to the primary filter receptacle, a secondary-side passage fluidly connected to the secondary filter receptacle, and a cross passage. The filter module further includes a service valve assembly at least partially within the cross passage and adjustable from a closed configuration blocking the primary-side fuel passage from the secondary-side fuel passage, to an open configuration.

In still another aspect, a module housing for a fuel filter module includes a one-piece housing body having an upper side, a lower side, and a plurality of transverse bolt holes extending horizontally through the one-piece housing body. The one-piece housing body includes a primary filter receptacle, and a secondary filter receptacle each formed in the upper side, a fuel supply inlet, a filtered fuel outlet, and a drain port formed in the lower side. The one-piece housing body further having formed therein a primary-side fuel passage fluidly connected to the primary filter receptacle and extending to an outgoing pump port formed in the lower side, a filtered fuel outlet, an incoming pump port formed in the lower side, and a secondary-side fuel passage fluidly connected to the secondary filter receptacle and to one of the outgoing pump port or the filtered fuel outlet. The one-piece housing body further has formed therein a cross passage extending between the primary-side fuel passage and the secondary-side fuel passage and structured to fluidly connect the primary-side fuel passage to the secondary-side fuel passage.

DETAILED DESCRIPTION

Figure 1:
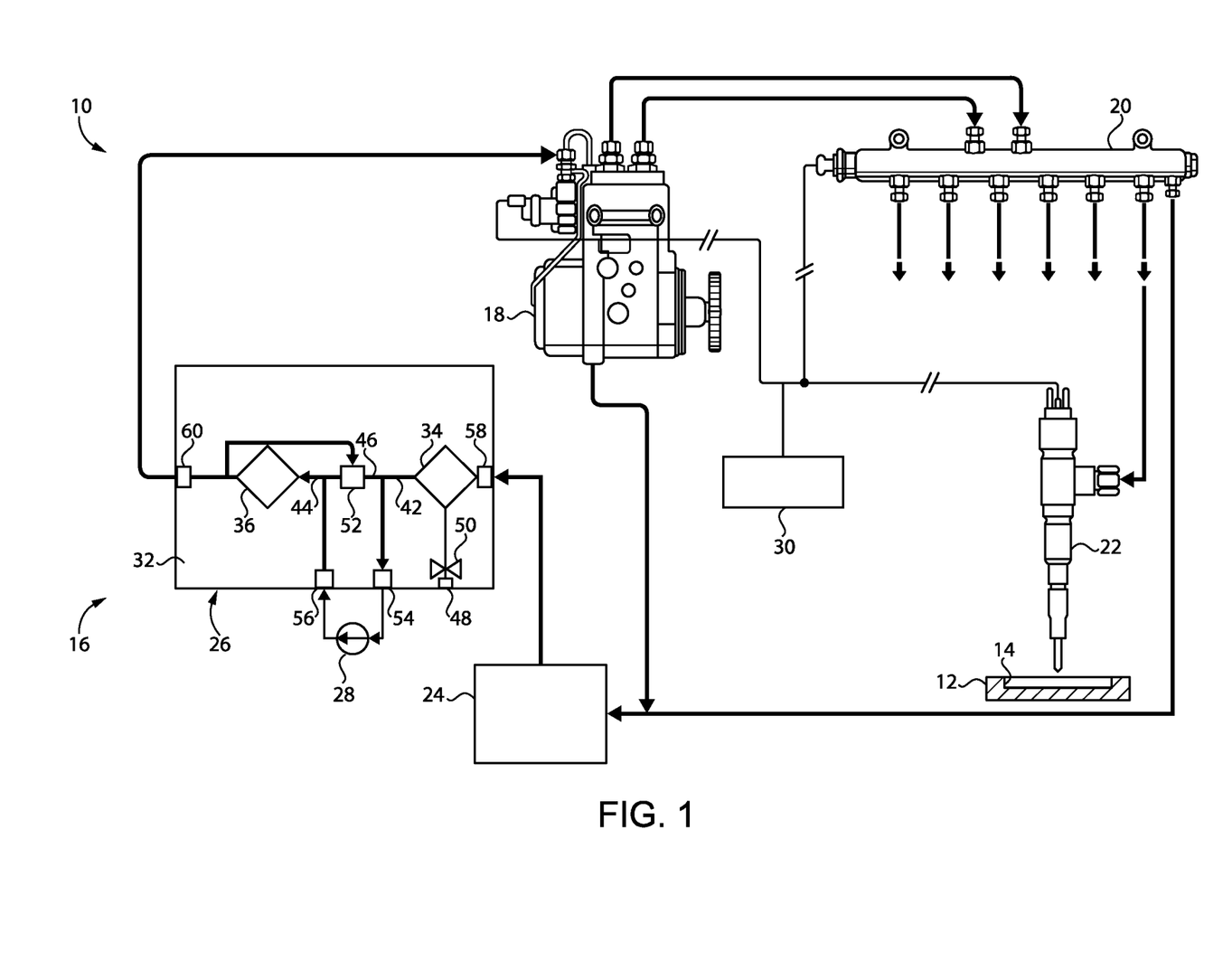
FIG. 1 is a diagrammatic view of an engine system, according to one embodiment.

Referring to FIG. 1, there is shown an internal combustion engine system 10, according to one embodiment. Engine system 10 includes an engine 12 having a plurality of combustion cylinders 14 formed therein, one of which is shown. The combustion cylinders can include any number and be in any suitable arrangement such as a V-pattern, an in-line pattern, or still another. Engine system 10 further includes a fuel system 16. Fuel system 16 includes a high-pressure pump 18 and a common pressurized fuel reservoir or common rail 20 structured to maintain a supply of pressurized fuel at an injection pressure for supplying to a plurality of fuel injectors 22, one of which is shown. Fuel system 16 also includes a fuel supply 24. Fuel supply 24 may contain a suitable compression-ignition fuel, such as a diesel distillate fuel. Fuel system 16 also includes a fuel filter module 26 having a module housing 32. Module housing 32 may be a one-piece metal casting or body. The terms module housing and body are used, at times, interchangeably herein. Engine system 10 can be applied in a variety of applications, including for powering a mobile vehicle, a pump, a compressor, or an electrical generator to name a few examples. As will be further apparent from the following description, fuel system 16 is configured by way of fuel filter module 26 for improved efficiency and serviceability as compared to certain known designs.

Fuel filter module 26 includes a primary filter 34, and a secondary filter 36 each coupled to module housing 32. The terms "primary" and "secondary" can be understood to refer to the ordering of fuel filtering with respect to a flow of fuel from fuel supply 24 to high-pressure pump 18. Thus, fuel may be filtered first by primary filter 34, and second by secondary filter 36. In some embodiments primary filter 34 may provide fuel filtration in a first stage that filters out particles having a relatively larger particle size, and secondary filter 36 may provide fuel filtration in a second stage that filters out particles having a relatively smaller particle size, however, the present disclosure is not thereby limited and the respective filters could have similar filtration fineness or efficacy.

Figure 2:
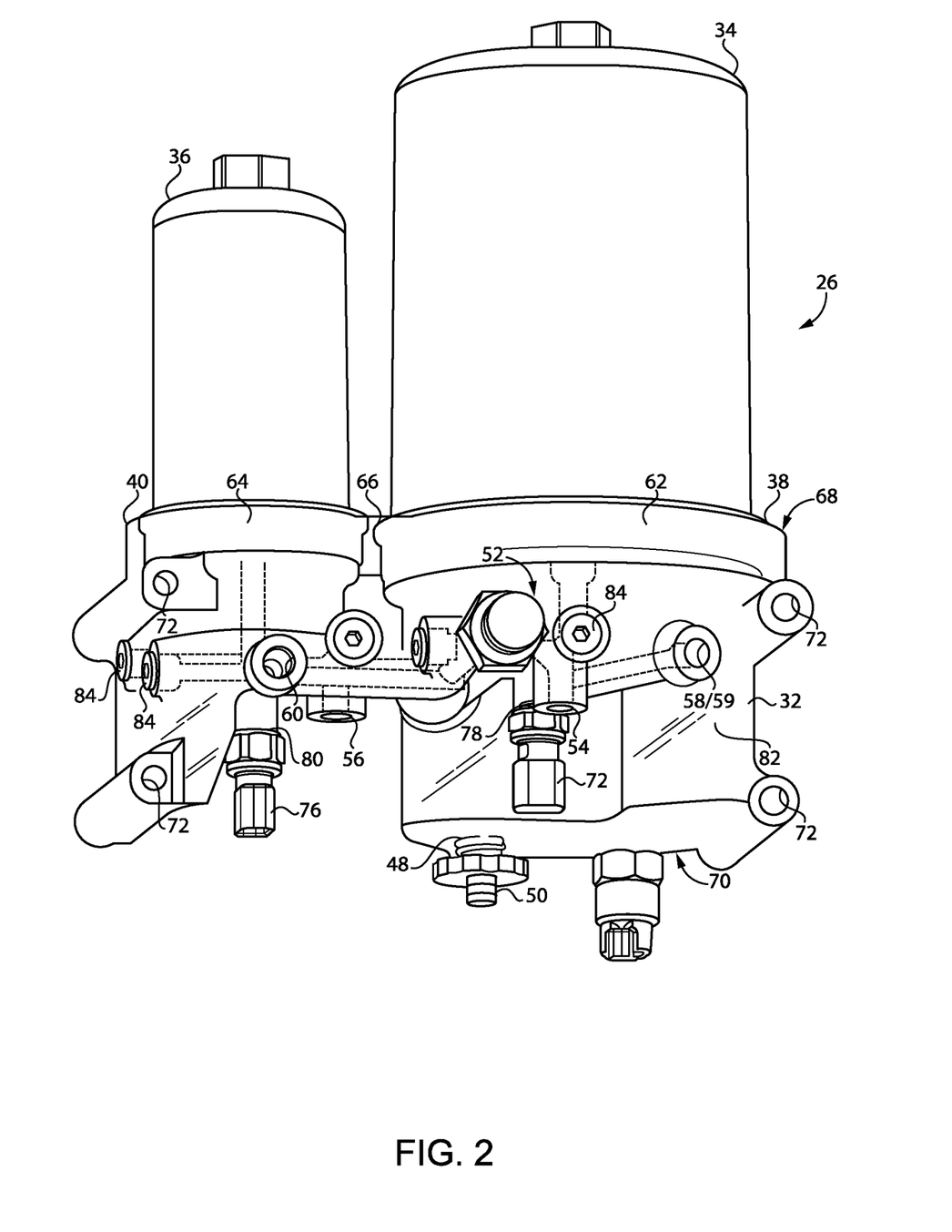
FIG. 2 is a diagrammatic view of a filter module, according to one embodiment.

Referring also now to FIG. 2, module housing 32 includes a primary filter receptacle 38 receiving primary filter 34, and a secondary filter receptacle 40 receiving secondary filter 36. Primary filter 34 and secondary filter 36 may be cartridge filters, however, again the present disclosure is not thereby limited. In an embodiment primary filter 34 and secondary filter 36 are engaged in the respective filter receptacles 38 and 40 via threaded engagement. In alternative embodiments a snap-in engagement strategy, a clamping strategy, or still another engagement strategy could be used. Also shown in FIG. 2 are a first sensor 74 coupled to module housing 32 at a first sensor port 78 and a second sensor 76 coupled to module housing 32 at a second sensor port 80. Sensor port 78 may fluidly connect to a primary-side fuel passage 42, and is located on a lower side 70 of module housing 32. Sensor port 80 may fluidly connect to a secondary-side fuel passage 44, and is located on lower side 70. In other embodiments different sensor port locations and fluid connection arrangements may be provided. Sensors 74 and 76 could include pressure sensors, temperature sensors, or still other types of sensors. Filter module 26 may be equipped with plugs 84 plugging additional ports that could receive additional sensors or other equipment in some embodiments. An electric control unit 30 is in communication with various components of fuel system 16, and including sensors 74 and 76.

Fuel filter module 26 also includes a drain valve 50 movable between a closed position blocking a drain port 48 formed in module housing 32, and an open position. In the illustrated embodiment module housing 32 includes a collection bowl 82, and drain port 48 is formed in collection bowl 82. It can also be seen from FIG. 2 that module housing 32 includes a primary lobe 62, a secondary lobe 64, and a neck section 66 connecting between primary lobe 62 and secondary lobe 64. Fuel filter module 26 also includes a service valve assembly 52, details and features of which are further discussed herein. Module housing 32 also includes an upper side 68 and lower side 70 as noted above. In the illustrated embodiment primary filter 34 is installed within primary filter receptacle 38 upon upper side 68 and secondary filter 36 is installed in secondary filter receptacle 40 upon upper side 68, although the present disclosure is not thereby limited. A plurality of transverse bolt holes 72 extend horizontally through module housing 32 to receive bolts for attaching fuel filter module 26 to a frame for service, such as by bolting fuel filter module 26 to an engine housing.

Figure 3:
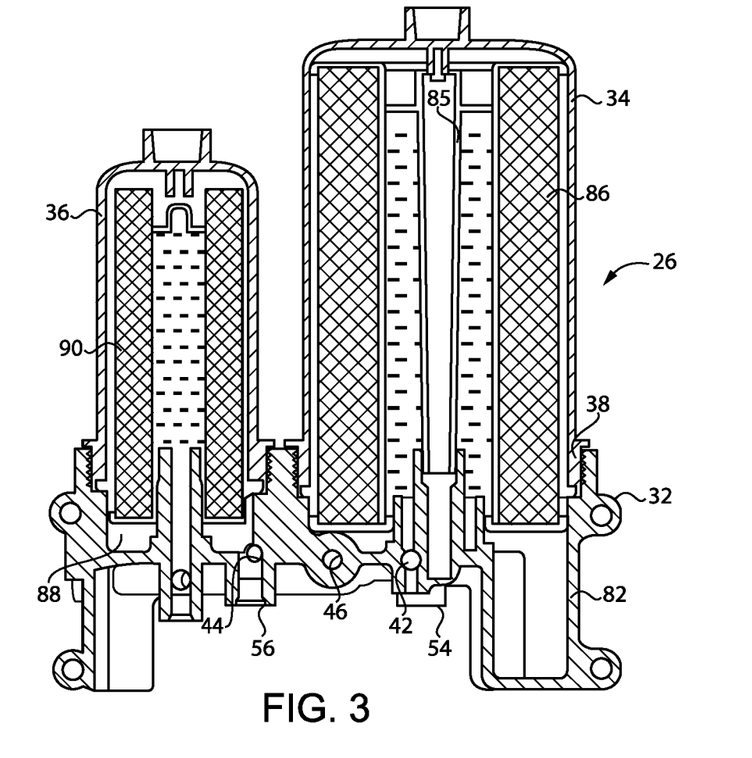
FIG. 3 is a sectioned side diagrammatic view of the filter module as in FIG. 2.
Figure 4:
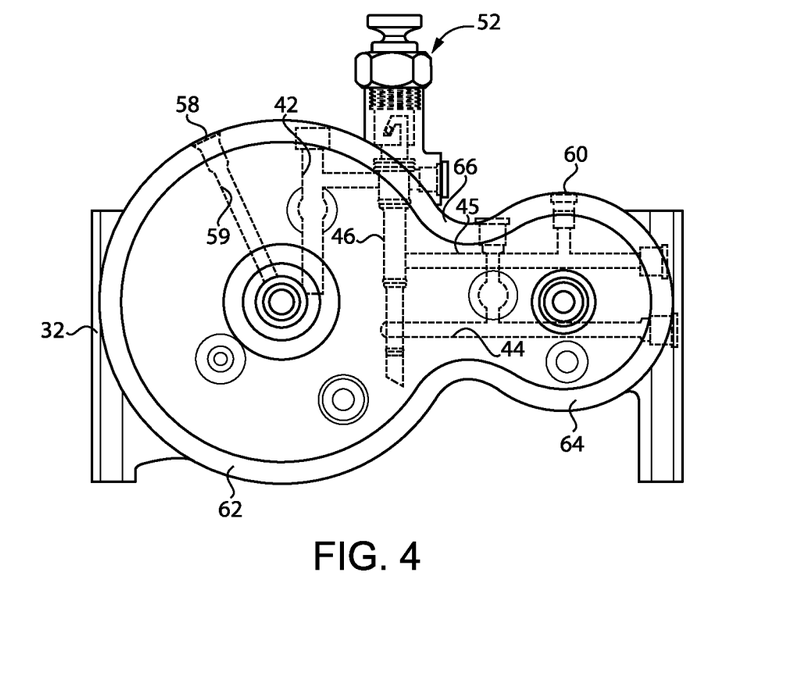
FIG. 4 is an elevational view of a filter module, according to one embodiment.

Referring also now to FIGS. 3 and 4, module housing 32 further has formed therein primary-side fuel passage 42, secondary-side fuel passage 44, and a cross passage 46 connecting between primary-side fuel passage 42 and secondary-side fuel passage 44. Service valve assembly 52 is positioned at least partially within cross passage 46 and is adjustable from a closed configuration blocking primary-side fuel passage 42 from secondary-side fuel passage 44, to an open configuration. As will be further apparent from the following description adjusting service valve assembly 52 to an open configuration can enable fuel from primary filter receptacle 38 and fuel from secondary filter receptacle 40, and including fuel within the respective filters and associated passages, to flow to collection bowl 82 and be drained, potentially along with water, debris, et cetera., through drain port 48.

Module housing 32 further has formed therein a fuel supply inlet 58 connecting to a fuel supply passage 59. As can be seen in FIG. 3 a central tube 85 extends vertically upward from primary filter receptacle 38 to enable a flow of fuel to rise vertically up through primary filter 34, spread outwardly and then flow down through a filter medium 86. The primarily filtered fuel can then flow into primary-side fuel passage 42, and thenceforth to an outgoing pump port 54 to supply the fuel to transfer pump 28. An incoming pump port 56 is also formed in module housing 32 and extends to secondary-side fuel passage 44 to be fed to a volume 88 located vertically beneath secondary filter 36. The flow of fuel from incoming pump port 56 can pass upwardly through a filter medium 90 and then flow downwardly toward a filtered fuel outlet 60. In the illustrated embodiment module housing 32 further has formed therein another secondary-side fuel passage 45. Secondary-side fuel passage 45 can feed the secondarily filtered fuel to filtered fuel outlet 60 for supplying to high-pressure pump 18. Also in the illustrated embodiment, each of filtered fuel outlet 60, drain port 48, outgoing pump port 54, and incoming pump port 56 opens at an outside surface of module housing 32. As noted above each of primary filter receptacle 38 and secondary filter receptacle 40 is positioned upon upper side 68 of module housing 32. Each of outgoing pump port 54, incoming pump port 56, and drain port 48 may be positioned upon lower side 70 of module housing 32. Cross passage 46 and collection bowl 82 may each be formed in primary lobe 62 of module housing 32. While the illustrated embodiment includes a first and a second secondary-side fuel passage 44 and 45 positioned fluidly upstream of secondary filter 36 and downstream of secondary filter 36, respectively, that connect to cross passage 46, in some embodiments only one such secondary side fuel passage may be used for draining fuel to drain port 48.

Figure 5:
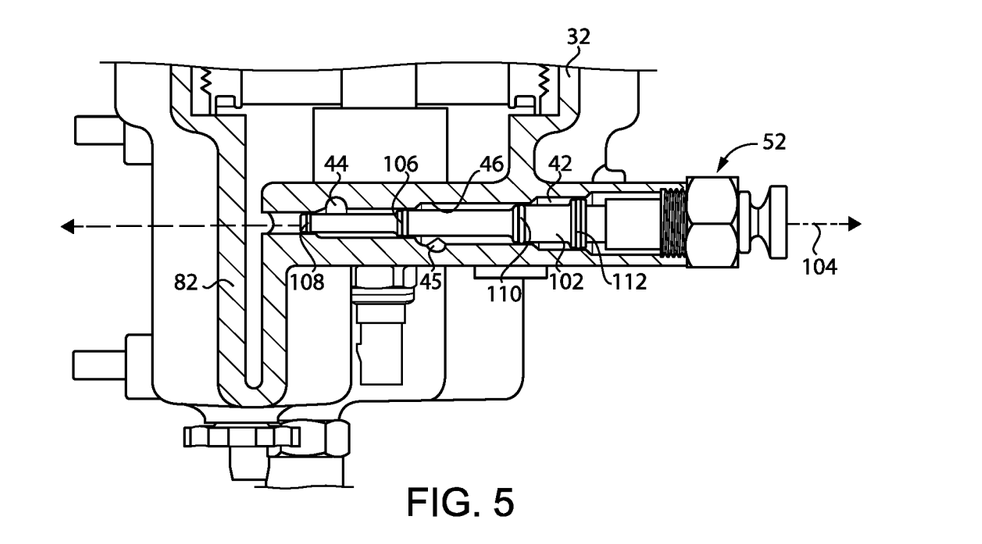
FIG. 5 is a partially sectioned side diagrammatic view of a filter module, according to one embodiment, including a service valve assembly in a closed configuration.
Figure 6:
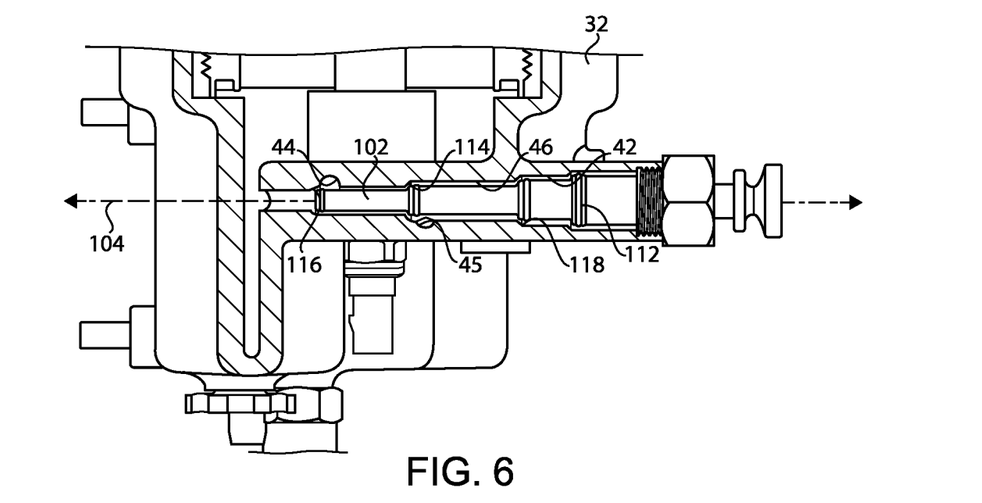
FIG. 6 is a partially sectioned side diagrammatic view of a filter module as in FIG. 5, with the service valve assembly in an open configuration.
Figure 7:
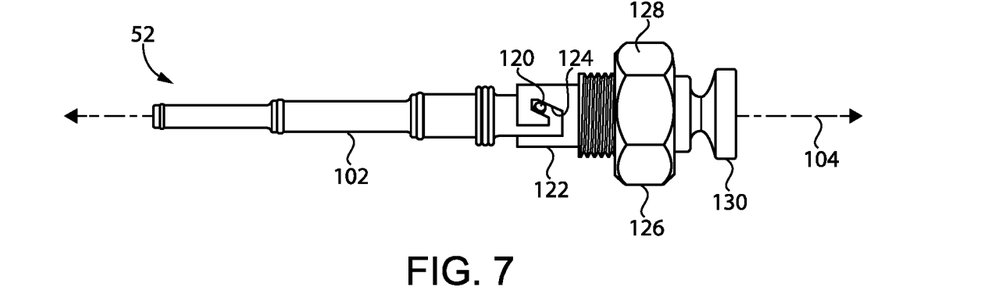
FIG. 7 is a side diagrammatic view of a service valve assembly, according to one embodiment.

Referring now to FIGS. 5-7, there is shown filter module 32 including features of service valve assembly 52 in further detail. In FIG. 5 service valve assembly 52 is shown as it might appear in the closed configuration blocking primary-side fuel passage 42 from secondary-side fuel passage 44. In FIG. 6 service valve assembly 52 is shown as it might appear in the open configuration such that primary-side fuel passage 42 is fluidly connected to secondary-side fuel passage 44 and also to secondary-side fuel passage 45. Service valve assembly 52 may include a valve pin 102 defining a longitudinal axis 104 and movable axially in cross passage 46 from a first position in the closed configuration to a second position in the open configuration. Service valve assembly 52 may also include a first O-ring seal 106, a second O-ring seal 108, a third O-ring seal 110, and a fourth O-ring seal 112 upon valve pin 102. At the first position, first O-ring seal 106 contacts a sealing surface 114 of module housing 32, within cross passage 46, at a first location fluidly between primary-side fuel passage 42 and secondary-side fuel passage 44. At the first position, second O-ring seal 108 contacts a sealing surface 116 of module housing 32 at a second location fluidly between primary-side fuel passage 42 and each of cross passage 46 and drain port 48. Also at the first position, third O-ring seal 110 may contact a sealing surface 118 of module housing 32 at a location fluidly between the first secondary-side fuel passage 44 and the second secondary-side fuel passage 45. It can thus be appreciated that moving valve pin 102 from the first position as in FIG. 5 to the second position as in FIG. 6 fluidly connects primary-side fuel passage 42 to both secondary-side fuel passages 44 and 45 and also fluidly connects cross passage 46 to drain port 48. At the first position, valve pin 102 is in sealing contact with module housing 32 at multiple sealing locations, and out of sealing contact with module housing 32 at the multiple sealing locations at the second position. This structure and functionality enables a single action to simultaneously open or close several fluid connections, and such that all of the fuel and/or other fluids contained in module housing 32 can drain, under the force of gravity, into collection bowl 82 and be removed from module housing 32 by opening drain valve 50.

With continued reference to the drawings generally but focusing now on FIG. 7, service valve assembly 52 may further include a locating pin 120 attached to valve pin 102. Locating pin 120 may have a fixed location upon valve pin 102. Service valve assembly 52 may also include a guide sleeve 122 fixed relative to module housing 32 and having formed therein an angled groove 124 receiving locating pin 120. Angled groove 124 extends partially circumferentially around longitudinal axis 104, and axially along longitudinal axis 104. Angled groove 124 may be helical, at least in part, and in the illustrated embellishment includes helical, circumferential, and axial sections. Valve pin 102 may have a first angular orientation about longitudinal axis 104 at the first position, and is rotated to a second angular orientation about longitudinal axis 104 at the second position. Twisting rotatable valve pin 102 relative to guide sleeve 122 in this manner causes locating pin 120 to be advanced through angled groove 124 and adjust valve pin 102 between the first position and the second position.

In an embodiment guide sleeve 122 is part of a collar 126 that is threaded engaged with module housing 32. Collar 126 may include a nut or the like 128, such as a hex nut, that can be engaged with a tool for securing collar 126 to module housing 132. Service valve assembly 52 may further include an adjustment knob 130 attached to valve pin 102 and located outside module housing 32. A user can manually, or with the assistance of a tool, rotate knob 130 to cause locating pin 120 to be engaged by way of angled groove 124 and translate valve pin 102 axially between the first position and the second position. In other embodiments, a different adjustment strategy could be used, such as a groove formed on valve pin 102 and a stationary locating pin formed as part of or attached to module housing 32. In such an iteration rotation of the valve pin could cause the groove on the valve pin to engage with the locating pin fixed relative to module housing 32 and achieve a similar effect.

INDUSTRIAL APPLICABILITY

Referring to the drawings generally, those skilled in the art will appreciate that fuel filter module servicing, typically entailing filter replacement, is desirable from time to time. When it is determined that replacement of one, and typically both, of primary filter 34 and secondary filter 36 is desired, a user can turn off fuel system 16 to halt the flow of fuel from fuel tank 24 to high-pressure pump 18, and proceed to twist valve pin 102 via knob 130 to open fluid communication between primary-side fuel passage 42 and secondary-side fuel passages 44 and 45. Fuel from primary filter 34 may freely drain into collection bowl 82, but until such time as service valve assembly 52 is opened fuel in secondary filter 36 and secondary filter receptacle 40 cannot drain. With service valve assembly 52 opened drain valve 50 can likewise be opened to collect the expelled fuel, water, and debris. Primary filter 34 and secondary filter 36 can then be swapped for fresh filters, for example cartridge filters as noted herein. Optionally filter module 26 can be flushed with clean fuel, and then drain valve 50 and service valve assembly 52 closed in anticipation of recharging fuel system 16 with fuel.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A fuel filter module for an engine comprising:
a primary filter;
a secondary filter;
a module housing including a primary filter receptacle receiving the primary filter, and a secondary filter receptacle receiving the secondary filter, and having formed therein a primary-side fuel passage, a secondary-side fuel passage, a cross passage connecting between the primary-side fuel passage and the secondary-side fuel passage, and a drain port;
a drain valve movable between a closed position blocking the drain port, and an open position; and
a service valve assembly at least partially within the cross passage and adjustable from a closed configuration blocking the primary-side fuel passage from the secondary-side fuel passage, to an open configuration; the service valve assembly including a valve pin defining a longitudinal axis and movable axially in the cross passage from a first position in the closed configuration to a second position in the open configuration.
2. The fuel filter module of claim 1 wherein:
the service valve assembly includes a first O-ring seal and a second O-ring seal upon the valve pin; and
at the first position, the first O-ring seal contacts the module housing, within the cross passage, at a first location fluidly between the primary-side fuel passage and the secondary-side fuel passage, and the second O-ring seal contacts the module housing at a second location fluidly between the cross passage and the drain port.

3. The fuel filter module of claim 2 wherein:
the service valve assembly includes a third O-ring seal;
the module housing further having formed therein another secondary-side fuel passage; and
at the first position, the third O-ring seal contacts the module housing fluidly between the first secondary-side fuel passage and the second secondary-side fuel passage.

4. The fuel filter module of claim 1 wherein the service valve assembly further includes a locating pin attached to the valve pin.

5. The fuel filter module of claim 4 wherein the service valve assembly further includes a guide sleeve fixed relative to the module housing and having formed therein an angled groove receiving the locating pin, and the valve pin is rotatable relative to the guide sleeve to advance the locating pin through the angled groove and adjust the valve pin between the first position and the second position.

6. The fuel filter module of claim 5 wherein the service valve assembly further includes an adjustment knob attached to the valve pin and located outside the module housing.

7. A fuel filter module for an engine comprising:
a primary filter;
a secondary filter;
a module housing including a primary filter receptacle receiving the primary filter, and a secondary filter receptacle receiving the secondary filter, and having formed therein a primary-side fuel passage, a secondary-side fuel passage, a cross passage connecting between the primary-side fuel passage and the secondary-side fuel passage, and a drain port;
a drain valve movable between a closed position blocking the drain port, and an open position;
a service valve assembly at least partially within the cross passage and adjustable from a closed configuration blocking the primary-side fuel passage from the secondary-side fuel passage, to an open configuration;
the module housing further having formed therein an outgoing pump port fluidly connected to the primary-side fuel passage, an incoming pump port fluidly connected to the secondary-side fuel passage, and a filtered fuel outlet; and
each of the filtered fuel outlet, the drain port, the outgoing pump port, and the incoming pump port opens at an outside surface of the module housing.

8. The fuel filter module of claim 7 wherein each of the primary filter receptacle and the secondary filter receptacle is positioned upon an upper side of the module housing, and each of the outgoing pump port, the incoming pump port, and the drain port is positioned upon a lower side of the module housing.

9. The fuel filter module of claim 8 wherein:
the module housing further includes a collection bowl, and the drain port is formed in the collection bowl; and
the module housing further including a primary lobe, a secondary lobe, and a neck section connecting between the primary lobe and the secondary lobe, and each of the cross passage and the collection bowl is formed in the primary lobe.

10. A filter module for an engine comprising:
a module housing including a primary filter receptacle, and a secondary filter receptacle, and having formed therein a supply inlet, a filtered outlet, and a drain port;
the module housing further having formed therein a primary-side passage fluidly connected to the primary filter receptacle, a secondary-side passage fluidly connected to the secondary filter receptacle, and a cross passage; and
a service valve assembly at least partially within the cross passage and adjustable from a closed configuration blocking the primary-side passage from the secondary-side passage, to an open configuration; the service valve assembly including a valve pin defining a longitudinal axis and movable axially in the cross passage from a first position in the closed configuration to a second position in the open configuration.

11. The filter module of claim 10 wherein the valve pin has a first angular orientation about the longitudinal axis at the first position, and is rotated to a second angular orientation about the longitudinal axis at the second position.

12. The filter module of claim 11 wherein the service valve assembly further includes an adjustment knob attached to the valve pin and located outside the module housing.

13. The filter module of claim 11 wherein the service valve assembly further includes a locating pin attached to the valve pin, and a guide sleeve fixed relative to the module housing and having an angled groove receiving the locating pin.

14. The filter module of claim 10 wherein the service valve assembly includes a first O-ring seal and a second O-ring seal upon the valve pin, and each of the first O-ring seal and the second O-ring seal is in sealing contact with the module housing at the first position, and out of sealing contact with the module housing at the second position.

15. The filter module of claim 14 wherein the first O-ring seal is in sealing contact with the module housing at a location fluidly between the cross-passage and the drain port at the first position, and the second O-ring seal is in sealing contact with the module housing at a location fluidly between the primary-side passage and the secondary-side passage at the first position.

16. A module housing for a fuel filter module comprising:
a one-piece housing body including an upper side, a lower side, and a plurality of transverse bolt holes extending horizontally through the one-piece housing body;
the one-piece housing body including a primary filter receptacle, and a secondary filter receptacle each formed in the upper side, a fuel supply inlet, a filtered fuel outlet, and a drain port formed in the lower side;
the one-piece housing body further having formed therein a primary-side fuel passage fluidly connected to the primary filter receptacle and extending to an outgoing pump port formed in the lower side, an incoming pump port formed in the lower side, and a secondary-side fuel passage fluidly connected to the secondary filter receptacle and to one of the outgoing pump port or the filtered fuel outlet; and
the one-piece housing body further having formed therein a cross passage extending between the primary-side fuel passage and the secondary-side fuel passage and structured to fluidly connect the primary-side fuel passage to the secondary-side fuel passage.

17. The module housing of claim 16 wherein the one-piece housing body includes a primary lobe having a collection bowl, a secondary lobe, and a neck section connecting between the primary lobe and the secondary lobe, and the drain port is formed in the collection bowl.

18. The module housing of claim 17 wherein the one-piece housing body further includes a first sensor port formed in the lower side and fluidly connected to the primary-side fuel passage, and a second sensor port formed in the lower side and fluidly connected to the secondary-side fuel passage.

\* \* \* \* \*